No. 827,742. PATENTED AUG. 7, 1906.
F. MARKGRAF.
VARIABLE SPEED AND REVERSING GEAR.
APPLICATION FILED FEB. 11, 1903. RENEWED JAN. 13, 1906.

No. 827,742.  
PATENTED AUG. 7, 1906.  
F. MARKGRAF.  
VARIABLE SPEED AND REVERSING GEAR.  
APPLICATION FILED FEB. 11, 1903. RENEWED JAN. 13, 1906.

WITNESSES:  
Fredk. Henderson  
J. C. Delaney.

INVENTOR  
F. Markgraf  
BY  
Duell, Megrath & Warfield  
ATTORNEYS.

No. 827,742. PATENTED AUG. 7, 1906.
F. MARKGRAF.
VARIABLE SPEED AND REVERSING GEAR.
APPLICATION FILED FEB. 11, 1903. RENEWED JAN. 13, 1906.

Witnesses:
Fred'k Henderson
J. C. Delaney

Inventor:
F. Markgraf
By Duell, Megrath & Warfield,
Attorneys.

UNITED STATES PATENT OFFICE.

FRANZ MARKGRAF, OF NEW YORK, N. Y.

VARIABLE-SPEED AND REVERSING GEAR.

No. 827,742.          Specification of Letters Patent.          Patented Aug. 7, 1906.

Application filed February 11, 1903. Renewed January 13, 1906. Serial No. 295,902.

*To all whom it may concern:*

Be it known that I, FRANZ MARKGRAF, residing in the borough of the Bronx, city of New York, in the county of New York and State of New York, have invented certain new and useful Improvements in Variable-Speed and Reversing Gears, of which the following is a full, clear, and exact description, such as will enable others skilled in the art to which it appertains to make and use the same.

My invention relates particularly to variable-speed and reversing gears designed for use on automobiles and other vehicles, although my improved gear may be employed with any class of machinery designed to be driven at variable speeds.

The main object of my invention is to provide a variable-speed gear in which the driving and driven gear-wheels may be thrown into and out of mesh without danger of stripping the teeth and with the minimum amount of wear, and I accomplish this object by making and breaking mesh between any pair of wheels while one wheel of that pair is running free, or, in other words, while there is no load thereon.

Another object of my invention is to provide a simple form of reversing-gear which is also thrown into and out of mesh while there is no load thereon, and a still further object is to provide a simple and positive controlling or operating mechanism for obtaining the various speeds and reversal.

Other objects will appear from what is hereinafter set forth.

In carrying my invention into effect I preferably employ two parallel shafts, on one of which, preferably the driving-shaft, are keyed gear-wheels of progressively-varying diameters, one for each forward speed and one for the reversing-gear, and on the other shaft are sleeved a series of driven gear-wheels progressively varying in diameter in the opposite direction and arranged to slide on the shaft, so as to be moved successively into and out of mesh with their respective driving-wheels on the driving-shaft. Each of the driven wheels is provided with clutch-jaws which engage movable jaws on the driven shaft, whereby, as will be hereinafter more fully pointed out, only one pair of wheels will carry the load, while the clutch-jaws of any other driven wheel, which may be in mesh with its respective driving-wheel, will slip during the operation of shifting the driving connection. The driven wheels for high and intermediate speeds are arranged to slide a distance equal to a little more than twice their width, so that in the idle position they will stand clear of adjacent wheels on the driving-shaft; but the low-speed driven wheel is arranged to slide a greater distance, so that it may be moved beyond the idle position to throw it into mesh with one pinion of the reversing-gear, it being understood that the reversing-gear is employed only with the lowest speed, although the reversing-gear may be duplicated, if desired, so that it may be employed with any other speed, and in that case the driven wheels for such other speeds will be arranged to slide to the same extent as the low-speed driven wheel.

I also employ other novel features and combinations of devices, which will be described in connection with the drawings and pointed out in the claims.

In a modified form of my improved gear, designed more particularly for very heavy work, I dispense with the movable clutch-jaws on the driven shaft and employ rigid jaws, said jaws being free to slip, however, during the shifting operation through a flexible connection in the shifting mechanism, whereby the same objects are accomplished.

My improved gear is illustrated in the accompanying drawings.

Figure 1:
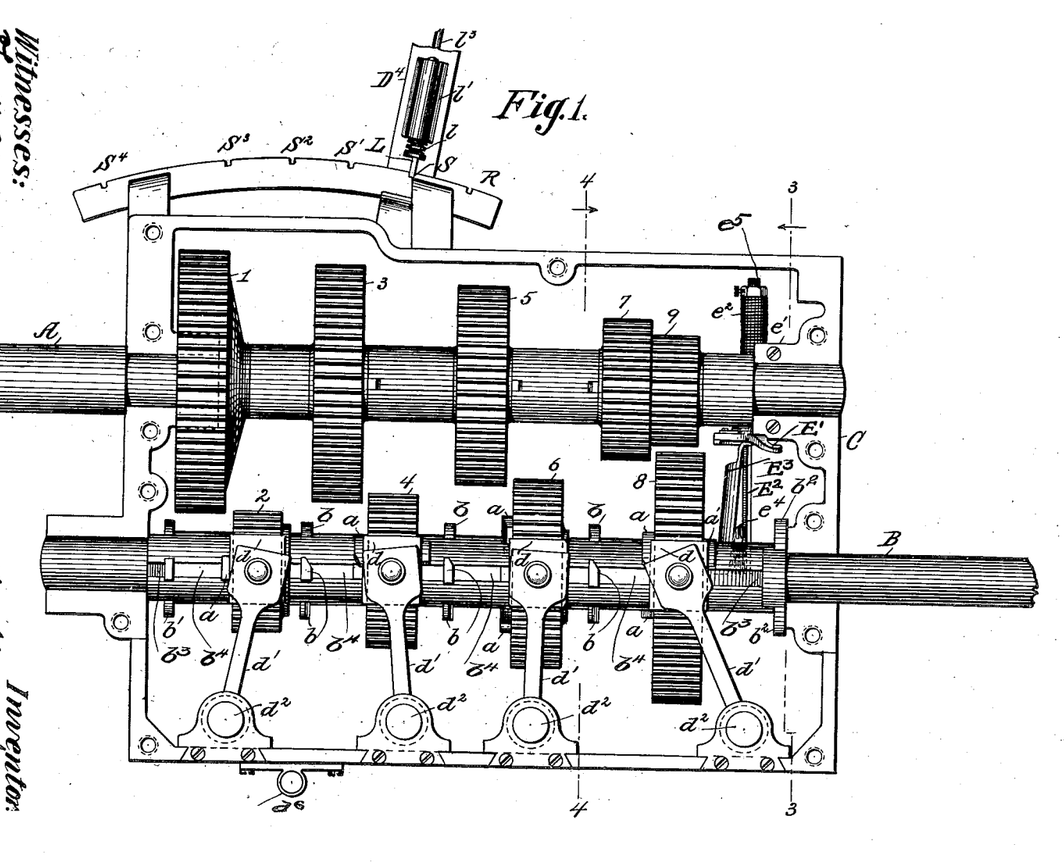
Figure 1 is a vertical elevation with part of the casing and the reversing-pinions removed.
Figures 5, 6, 7, 8, 9:
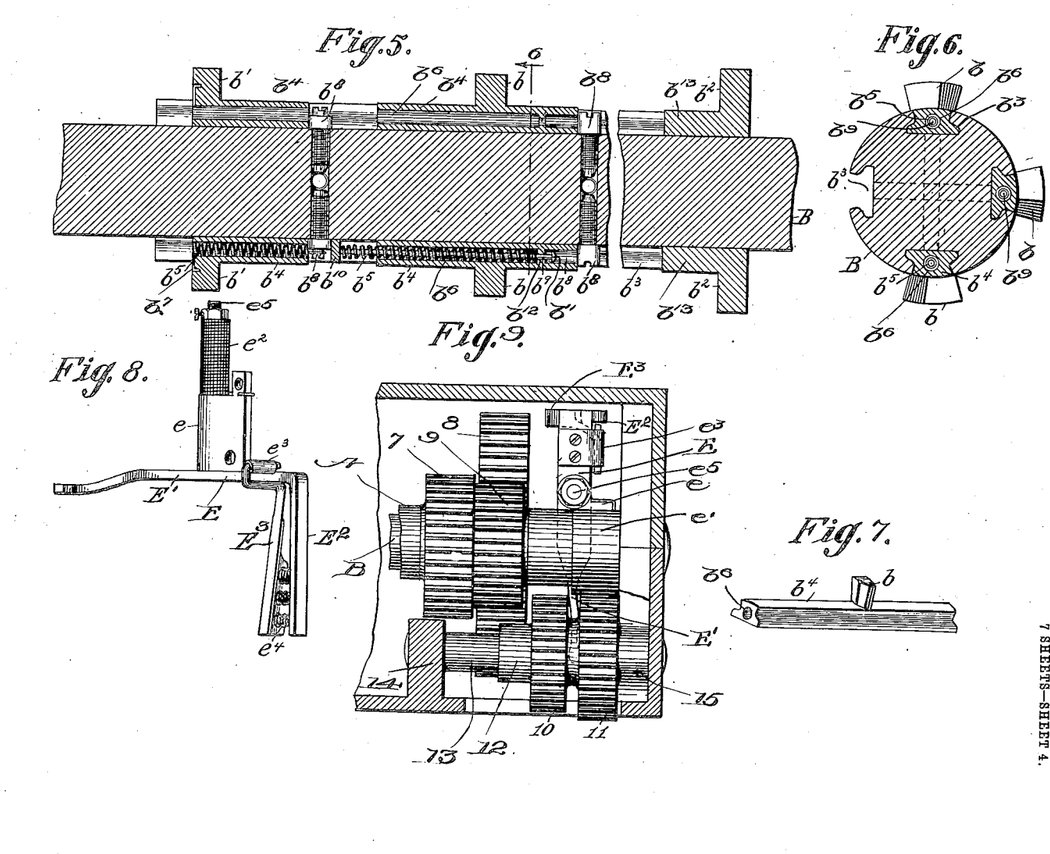
Fig. 5 is an enlarged central longitudinal section of the driven shaft, illustrating the movable clutch-jaws.
Fig. 6 is a cross-section of Fig. 5 on line 6.
Fig. 7 is a perspective view of one of the movable clutch-jaws.
Fig. 8 is a detail perspective view of parts of the reversing mechanism.
Fig. 9 is a section on line 9, Figs. 3 and 4, showing the reversing mechanism, the reversing-pinions being shown out of engagement with other pinions or gears.

Referring to the drawings, in which similar reference-symbols refer to the same parts in the different views, A and B are the driving and driven shafts, respectively, and C indicates the casing in which the bearings for said shafts are formed, and which casing in practice may be made with tight joints and packed bearings to retain oil. The driving-shaft has keyed thereon and properly spaced by sleeves or otherwise the driving-wheels 1, 3, 5, 7 and 9, the latter being the driving-wheel for the reversing-pinions. The driven shaft has sleeved thereon the driven wheels 2, 4, 6, and 8. Each wheel being provided with clutch-jaws $a$ arranged to engage sliding spring-pressed clutch-jaws $b$ on the shaft B. The clutch-jaws $a$ on wheels 4, 6, and 8 are beveled off at one side, as shown in Figs. 1, 6, and 7, and the coöperating jaws $b$ are also beveled off, but on the opposite side, so that the jaws of one set may slip when the shaft is driven by gear-wheels of higher speed. The coöperating jaws $a$ $b'$ for wheel 2 are not beveled, since this is the high-speed wheel and no slippage is required. Wheel 8 is provided with an extra pair of jaws $a'$, which engage a pair of jaws $b^2$, Figs. 1 and 3, when wheel 8 is shifted to the extreme right to move the reversing-pinions in mesh. The clutch-jaws and shaft B are shown in detail in Figs. 5, 6, and 7. Shaft B is provided with longitudinal, dovetailed slots $b^3$, in which the slides $b^4$, carrying the jaws, are adapted to slide against the tension of springs $b^5$, which are carried in the bore $b^6$ of said slides. As shown in Fig. 5, the springs for the slides carrying jaws $b'$ have hooked ends $b^7$, which engage the slides and the opposite ends are looped around stops $b^8$, which are preferably screw-threaded studs. It will be seen that if the jaws on wheel 2 strike jaws $b'$ when that wheel is moved into mesh with wheel 1 the jaws will move to the left and that when the jaws clear each other the springs $b^5$ will draw jaws $b'$ back into locking position between jaws $a$. The object in having movable jaws at this point is mainly to prevent undue cramping and straining of the jaws and the shifting mechanism should the jaws strike when wheel 2 is shifted and before the shifting-lever reaches its position of full-shift. The springs $b^5$ for the slides carrying jaws $b$ are carried by rods $b^9$, having at one end heads $b^{10}$, which bear against studs $b^8$, and at the opposite ends have heads $b^{11}$, which serve as guides, the end of the spring in the bore bearing against a shoulder $b^{12}$ to push the slides to the right. The movement of slides $b^4$ to the right is limited by studs $b^8$, as shown in Fig. 5. Clutch-jaws $b^2$ are shown as stationary, and while they are shown as provided with blocks $b^{13}$, fitting slots $b^3$, they may be mounted on and secured to the shaft in any other suitable manner. If desired, these jaws may also be arranged to slide, but at this point movable jaws are not necessary, since the strain is not so great and because jaws $a'$ of wheel 8 are generally brought into locking position therewith while at rest, and for these reasons jaws $a'$ and $b^2$ are not beveled off to facilitate slippage.

The shifting device for each driven wheel comprises a pair of shoes $d$, pivoted at diametrically opposite points to arms $d'$, carried by a pivoted rod $d^2$, which is provided with an operating-arm on the exterior of the casing and which arm has a stud engaging a cam-slot in the cam-wheels of the shifting mechanism. The operating-arms for the shifting devices of driven wheels 8, 6, 4, and 2, respectively, are the arms $8^a$, $6^a$, $4^a$, and $2^a$, and the cam-grooves in which move the studs $8^c$ $6^c$ $4^c$ $2^c$, which move the arms, are $8^b$, $6^b$, $4^b$, and $2^b$, respectively. These cam-slots are cut in opposite sides of disks D and D', the former having the slots $8^b$ and $6^b$, which control the first and second speed connections, respectively, and the latter having slots $4^b$ and $2^b$, which control the third-speed and the fourth or high speed connections, respectively. These disks are provided with gear-teeth, which are always in mesh, and they are mounted on stub-shafts T T', projecting from the casing, as shown, and disk D' has keyed to it a pinion $D^2$, which meshes with a curved rack $D^3$, carried by the controlling-lever $D^4$, pivoted to the bottom of the casing by the rod $d^5$, which is fitted to rock in the bearing $d^6$. In practice when the gear is applied to a vehicle the controlling-lever $D^4$ will be connected to a controlling-lever proper near the seat of the operator and be provided with suitable locking-stops; but for the purpose of simple illustration I have shown the locking-stops mounted directly on the gear-box. As shown, the controlling device consists of a curved plate having stops or notches S, S', $S^2$, $S^3$, $S^4$, and R, indicating, respectively, stop, first speed, second, third, and fourth speeds, and the reversing position. To engage the notches, I provide a locking-dog L, which is forced into the notches by a spring $l$, carried in a barrel $l'$, mounted on lever $D^4$. The dog L is pivoted on a block $l^2$, said block and lever $D^4$ being slotted to receive the dog which is disengaged from the notches by a rod $l^3$, which extends above the handle end of the lever and terminates in a knob to be engaged by the operator's thumb. This makes a very simple and easily-operated locking arrangement and is not interfered with by the grip of the operator on the controlling-lever.

Figure 3:
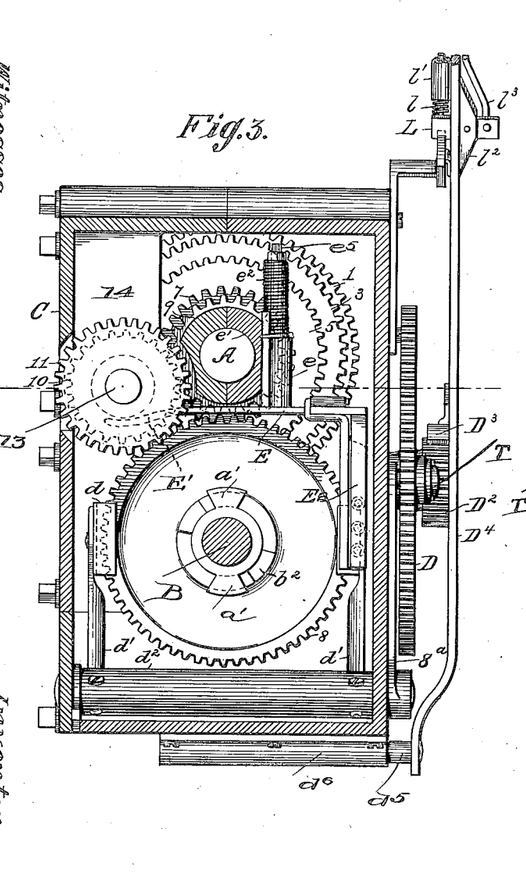
Fig. 3 is a vertical cross-section taken on the line 3 3 of Fig. 1.
Figure 4:
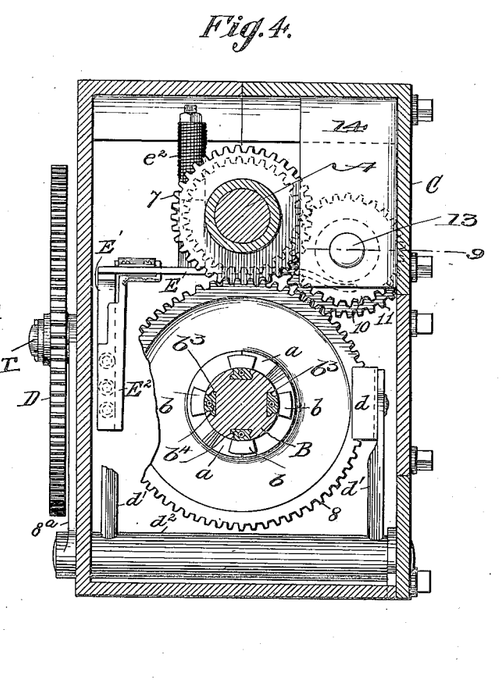
Fig. 4 is a similar sectional view taken on the line 4 4 of Fig. 1.
Figure 10:
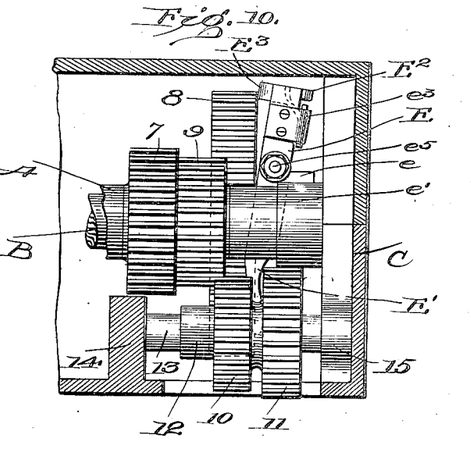
Fig. 10 is a similar view showing the pinions moved with one pinion in engagement with the driving-pinion, but with the slow-speed gear out of engagement so that the driven shaft is not operated.
Figure 11:
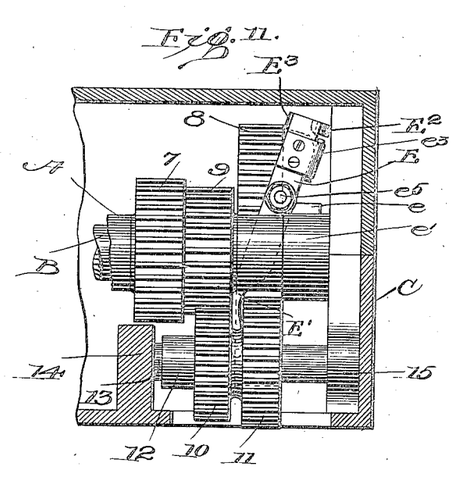
Fig. 11 is a similar view showing the slow-speed gear in engagement with one of the reversing-pinions.
Figure 12:
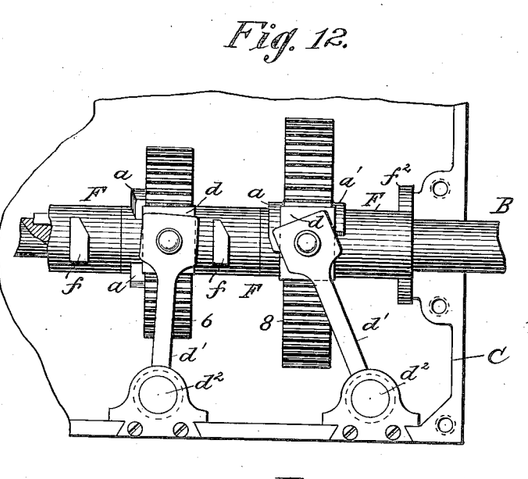
Figs. 12, 13, 14, 15, and 16 illustrate the details of a modified form in which rigid clutch-jaws are employed between the driven wheels and driven shaft, and in which the flexible connection is placed in the shifting mechanism, as shown in Fig. 13.

The reversing-pinions are marked 10 and 11 and are adapted to mesh, respectively, with driving-wheel 9 and low-speed driven wheel 8. These pinions are keyed to or formed integrally with a sleeve 12, sliding on a rod 13, rigidly mounted on the side and end walls of the casing at 14 and 15, as shown in Figs. 9, 10, and 11. Pinions 10 and 11 are normally in the position shown in Fig. 9, where they are held by a pivoted spring-pressed lever E, having an arm E′, projecting between the pinions, and an arm E², projecting downward at right angles to arm E′ and in the path of movement of wheel 8. This lever has an upwardly-projecting pivot-rod $e^5$, which passes through a bearing-block $e$, secured to the rear side of bearing $e'$ of shaft A, as shown in Figs. 1 and 3. This pivot-rod has a spring $e^2$ coiled around it and serves to throw arm E′ to the right to hold pinions 10 and 11, as shown in Fig. 9. Arm E² is provided with a spring-cushioned arm E³, which is pivoted on a plate $e^3$, secured to the rear end of lever E. Between arms E² and E³ are stiff coiled springs $e^4$; but any kind of spring may be employed, or a stiff blade-spring may be substituted for arm E³. The object of these springs is to afford a sufficiently rigid arm when engaged by the shoe $d$ of wheel 8 to swing lever E against the tension of spring $e^2$, and thereby shift pinions 10 and 11 to the left, as shown in Figs. 10 and 11, and at the same time afford a yielding arm to prevent straining of the parts and undue grinding of the teeth on wheels 9, 10, 11, and 8 in bringing them into mesh. A further and important object of the yielding arm is to insure the wheels 9 10 and 8 11 being fully in mesh before clutch-jaws $a'$ $b^2$ are locked, the final movement of shoes $d$, which engage wheel 8, compressing spring $e^4$ as the jaws are locked.

Figure 2:
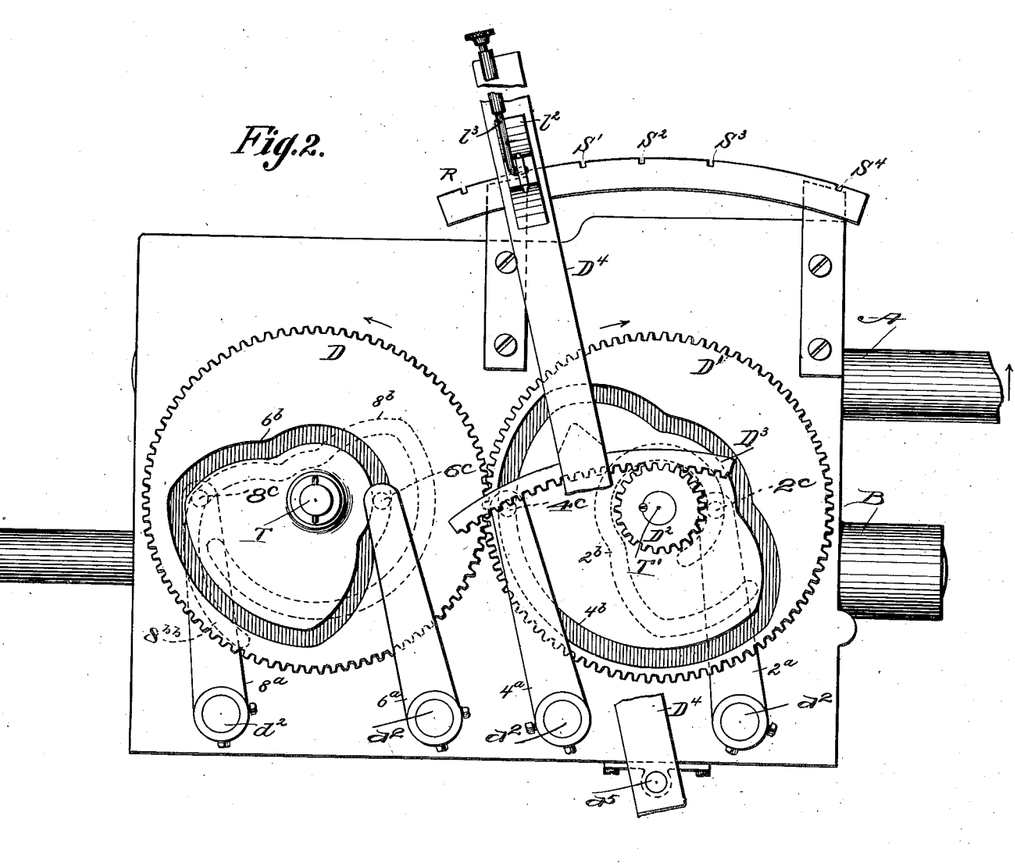
Fig. 2 is a vertical elevation showing the opposite side of the casing which carries part of the shifting mechanism.
Figure 13:
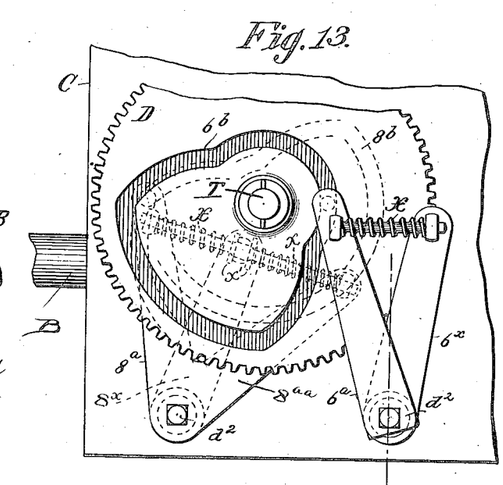
Figure 14:
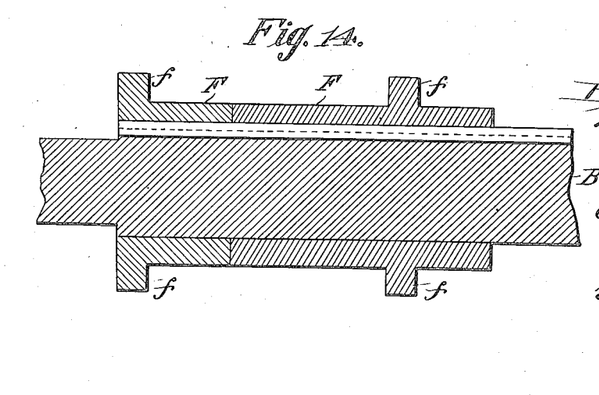
Figures 15, 16:
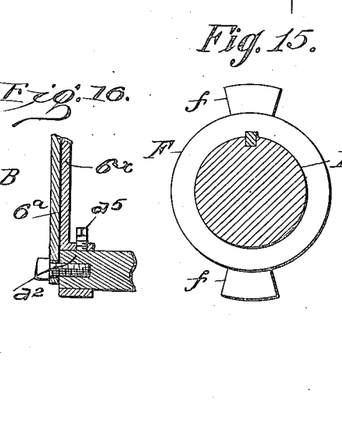
Figure 17:
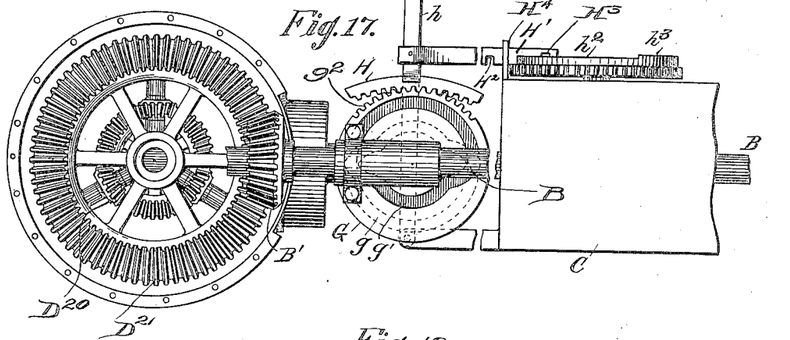
Figs. 17, 18, 19, and 20 illustrate mechanism for obtaining a direct driving connection between the engine or driving-shaft and the differential compensating gear commonly employed on the driven axle of automobiles.
Figure 18:
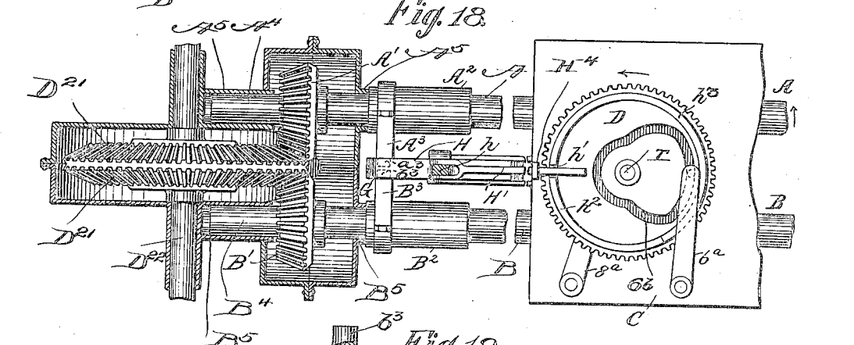

Referring now to Figs. 12 to 16, inclusive, which show the modified form of my invention, B indicates the driven shaft, and F indicates sleeves keyed to the shaft and provided with beveled clutch-jaws F, adapted to be engaged by clutch-jaws $a$ on wheels 6 and 8. Clutch-jaws $f^2$, formed integrally with sleeve F, correspond to jaws $b^2$ of Fig. 1 and are engaged by jaws $a'$ of wheel 8 when the reversing-gear is operated. The driven wheels are loosely mounted on sleeves F. In Fig. 13 arms $8^a$ and $6^a$, which engage cam-grooves $8^b$ and $6^b$, correspond to arms $8^a$ and $6^a$ of Fig. 2, and a similar set of arms will be provided for wheel D′. In this arrangement arms $8^a$ and $6^a$ are loosely mounted on rods $d^2$, as shown by Fig. 16, and are operatively connected therewith through auxiliary arms $8^\times$ and $6^\times$, and stiff coiled springs X, arms $8^\times$ and $6^\times$ being keyed by the set-screw $d^5$, Fig. 16, to rods $d^2$. By reference to Fig. 13 it will be seen that as arm $8^a$ is moved by its cam-groove its movement will be imparted to arm $8^\times$ by spring X, thereby turning rod $d^2$ and moving lever $d'$ to shift wheel 8. In this construction the arm $8^a$ has another arm $8^{aa}$, formed therewith. A double spring is between each of the said arms, the inner ends of said springs bearing on washers $x'$, loosely sleeved on a rod passing through said springs, the said rod passing through a lug having an opening therein carried by the arm $8^\times$. If in shifting the wheel its jaws $a$ should strike jaws $f$, the spring X between arms $8^a$ and $8^\times$ will yield while the operator continues to apply pressure to the controlling-lever, thereby avoiding the straining of the shifting mechanism, and similarly while the clutch of a higher-speed gear is still locked during the changing operation the jaws of the lower-speed gear will slip over each other, thus forcing their respective driven wheel backward or to the right, and this movement will, through arms $d'$, turn rod $d^2$, and this rod will swing its arm $8^\times$ backward while the operator is still moving or applying pressure to the controlling-lever D⁴; but no damage will be done, since spring X will simply be compressed.

The operation of the apparatus is as follows, assuming that shaft A rotates in the direction of the arrow on that shaft. Starting from the position of rest, Figs. 1 and 2, lever D⁴ is moved to position S′. This movement, through rack D³ and pinion D², rotates disks D and D′ in the direction of the arrows and produces a relative movement of the cam-grooves in said disks and their coöperating arms. During this first movement it will be observed that the pins on studs 2° 4° 6° on arms 2ª, 4ª, and 6ª travel in the concentric parts of their respective cam-grooves, and hence no movement is imparted to those arms; but the pin 8° on arm 8ª is moved toward the center of disk D. This movement, through arms 8ª and rod $d^2$, swings arm $d'$, Fig. 1, to the left and moves wheel 8 into mesh with wheel 7, and if the clutch-jaws $a$ should happen to strike before locking the movable jaws $b$ will be forced to the left against their springs, and as the wheel rotates the springs will force jaws $b$ back into locking position between jaws $a$. The driving connection established by this movement will be from shaft A and gear 7 to gear 8 and shaft B, which is the low-speed connection. To obtain the next higher speed, lever D⁴ is moved in position S². During this movement the pins 4° and 2° on arms 4ª and 2ª will continue to travel in the concentric parts of grooves 4ᵇ and 2ᵇ, and hence wheels 4 and 2 remain stationary. The effect of this movement is to swing arm 6ª to the right, Fig. 2, and arm $8^h$ back to the position shown in Fig. 2; but the short concentric part of groove $8^b$ near the center of disk D will hold lever $8^a$ stationary for a short interval, thus maintaining a driving connection. When arm $6^a$ arrives in the concentric part of groove $6^b$ near the periphery of the disk, wheel 6 will be fully in mesh with wheel 5 and its clutch-jaws locked. As wheel 8 moves back shaft B will rotate faster, and the clutch-jaws $a$ of this wheel will slip over the jaws $b$ until the movement of disk D shifts this wheel far enough to the right, Fig. 1, to cause the jaws $a$ to clear jaws $b$, and in the subsequent movement of disk D wheel 8 will return to its idle position. To obtain the next higher speed, the lever $D^4$ is moved to notch $S^3$, when the gear 4 will be moved to the left, Fig. 1, into engagement with the gear 3 by the lever $d'$, which is operated by the lever $4^a$, the pin $4^c$ of which moves in the groove $4^b$, and at the same time that the gear 6 is moved to the right out of engagement with gear 5. During this operation the pin $8^c$ moves in the concentric part of the groove $8^b$ and the wheel 8 is still held out of engagement. The spring-jaws B and clutch-jaws $a$ of the gear 4 operate the same as the jaws $a$ $b$ for the wheels 6 and 8. By throwing the lever to notch $S^4$ the wheel 2, the higher-speed wheel, is moved in the same manner into mesh with gear 1, and gear 4 is, by the shape of the groove $4^b$, through the pin $4^c$, working in said groove, the levers $4^a$, and rod $d^2$ and $d'$, out of mesh with the gear 3, and the pin $6^c$ $8^c$, moving in the concentric parts of the grooves $8^b$ $6^b$, will, through levers $8^a$ $6^a$, hold these gears 8 and 6 out of mesh with their respective driving-gears 5 and 7. To move from one speed to another, it is only necessary to throw the lever $D^4$ into its proper notch, when the appropriate gear will be shifted into mesh, and another gear will be thrown out, and the driven gears not being operated upon by the levers will be held out of engagement with their driving-gears. It is to be understood, of course, from the above description that the gear that is being moved out of mesh does not leave its corresponding driving-gear until the gear being moved into mesh is clutched to the shaft B. At all times when moving from one speed to another, either higher or lower, the lower-speed gear will, owing to the driving-shaft being speeded up, slip by the spring-jaws until it is entirely connected or disconnected from its driven gear. By this arrangement it will be seen that there will be no unnecessary strain on the gear-teeth, that at all times one of the driven gears will be in mesh with a driving-gear during the shifting operation, the vehicle be under control at all changes in speed, and at no time will the gears lose their grip in changing from one speed to another. To change the direction of motion of the driven gear, assuming the parts to be in the position shown in Figs. 1, 2, and 9, the lever $D^4$ is moved to notch R. This will cause the pinion $D^2$, through the rack $D^3$, to move the wheels $D'$ and D in the opposite direction from that indicated by the arrows on Fig. 2. Owing to the shape of the groove $8^{bb}$, the lever $8^a$, through the pin $8^c$, working in said groove, will be thrown to the left, Fig. 2, and the lever $d'$, connected therewith, through rod $d^2$, will throw the gear 8 to the right, Fig. 1. As the lever is being moved to notch R the gear 8 is moved to the right, where it contacts with the downwardly-spring-pressed arm $E^3$, and the compression of the springs $e^4$ on the downwardly-projecting arm $E^2$ throws the forward arm $E'$ of the lever E to the left, so that the reversing-gears 10 and 11 are moved to the left, as shown in Fig. 10, so that in this position the reversing-gears are in operative position, but are not in contact with the driven gear 9. When the gear 8 is moved to its extreme position to the right, the gears 10 and 11 are moved into mesh with gear 8, and the clutch-jaws $a'$ of gear 8 engage the clutch-jaws $b^2$ of the driven shaft, and this shaft will be driven in the reverse direction from that before the reversing-gears 10 and 11 had been thrown into operative position. Moving the lever $D^4$ back to S, the gear 8 moves to the left and throws 10 and 11 to the right to its idle or rest position, as shown in Fig. 9.

It is believed that it is not necessary to set forth in detail the operation of the modified construction shown in Figs. 12 to 16. It is to be understood, of course, that the mechanism is the same, except that the jaws $f$ are stationary and that the springs between levers $8^a$ and $8^\times$, $6^a$ and $6^\times$ permit the lower speed-gear to slip when changing from one speed to the other until the driven gear being moved into operative position is in full engagement with said driven shaft and the one being moved out is out of engagement of the shaft.

Figure 19:
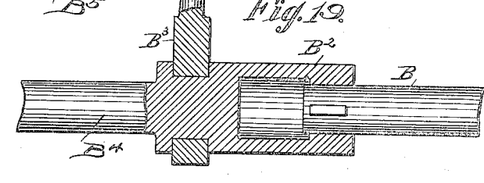
Figure 20:
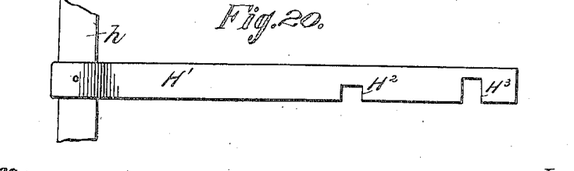

In Figs. 17 to 20, inclusive, are illustrated the driving connections between the driven shaft B and the usual bevel or compensating gear on the driven axle and the additional connection between that gear and the engine or driving-shaft A for a direct driving connection. $A'$ and $B'$ are the driving-pinions for the compensating gear $D^{20}$. As shown, both of them are in mesh with the gear $D^{21}$; but either one or the other may be moved out or placed in mesh with said gear $D^{21}$ by moving the lever $h$ in a manner to be described. As shown, these pinions are carried by shafts $A^4$ $B^4$, arranged to slide in bearings $A^5$ $B^5$ in the gear-box $B^6$, and one end of each shaft is provided with slide-couplings $A^2$ and $B^2$, to which shafts A and B are connected, as shown in Fig. 19. Those couplings are provided with arms $A^3$ and $B^3$, having reduced ends $a^3$ $b^3$, which move in cam-grooves $g$ and $g'$, respectively, formed in opposite sides of cam-disk G. This disk is provided with gear-teeth $q^2$, meshing with a curved rack H, which is moved in either direction by lever $h$. The movement of this lever is controlled by arm H', which is provided with two notches H² and H³, which coöperate with flange $h^2$ and $h^3$ on disk D. The part of the flange $h^3$ is higher than part $h^2$, and the width of these parts correspond to the depths of notches H³ and H², so that disk D can be rotated only when lever $h$ is in either one of two positions, and lever $h$ can only be shifted while arm H' is in line with the notch $h'$ in the flange. The position of the parts shown by Figs. 17 and 18 indicate the position of the lever when the variable-speed gear set for the second speed and flange $h^2$ $h^3$ are in position to permit the shifting of the lever $h$ in either direction to disconnect either pinion A' or B'. When the parts are in this position, the second speed-gears 5 and 6, which are of the same diameter, are in mesh and may be driven forward. The arm H' being in the notch $h'$, it may be shifted in either direction to move either one or the other of the beveled gears A' or B' out of mesh with the gear $D^{21}$. Suppose it is desired to drive the shaft $D^{22}$ directly from the shaft A without driving through the variable-speed shaft B. The lever $h$ is thrown to the right, Figs. 17 and 18, and the gear B' will be moved to the right by the end of the arm B³ moving in the cam-groove $g'$ out of mesh with gear $D^{21}$ and the notch H² moved over the flanges $h^2$ and $h^3$. When the parts are in this position, the wheel D, carrying this flange, can be rotated by the lever D⁴. This lever is now moved to the "rest-notch" S, when the gear 6 will be moved out of mesh with 5, the shape of the groove 6ᵇ moving the levers 6ᵃ and $d'$ to move the gear 6, as thus stated. By the next movement part $h^3$ of the flange now strikes the side of the arm H', and the disk D cannot be further moved. It is to be noted that this arm H' moves in a strap H⁴, which prevents the arm from being raised, so that the part of the flange $h^3$ cannot move in said notch H². To drive the shaft $D^{22}$ through the speed-gears, so that there can be variable speeds given to said shaft B, the lever D⁴ is thrown to the right as far as S². In this operation the lever $h$ is moved to the left, A' is moved out of engagement with the gear $D^{21}$ through the reduced end of arm A³ moving in groove $g$ of disk G, and the gear B' remains in engagement with gear $D^{21}$. The notch H³ in the arm H' is then in such position that the disk D can be turned entirely around in either direction, this notch H³ being sufficiently deep or high to permit that part of the flange $h^3$ to pass through it without obstruction. The lever D⁴ can then be moved to any of the notches S', S², S⁷, S⁴, and R to obtain any of the speeds desired or to reverse, the power being driven from shaft A through the speed-gears to shaft B, beveled gear B', gears $D^{21}$ $D^{20}$ to shaft $D^{22}$.

Various changes or modifications can be made in the invention herein described without departing from the spirit thereof.

Having described my invention, what I claim as new, and desire to secure by Letters Patent, is—

1. In a variable gear, the combination of a driving-shaft, two or more gears of different diameters keyed thereon, a driven shaft, a corresponding set of gears sleeved thereon, clutches for locking said gears to the driven shaft, and means for shifting said driven gears into and out of mesh, substantially as described.

2. In a variable gear, the combination of a driving-shaft, two or more gears of different diameters keyed thereon, a driven shaft, a corresponding set of gears sleeved thereon, clutches for locking said gears to the driven shaft, and means for shifting said driven gears into and out of mesh with the driving-gears without breaking the connection between the shafts, substantially as described.

3. In a variable gear, the combination of a driving-shaft, a plurality of gears of different diameters keyed thereon, a driven shaft, a plurality of gears sleeved thereon, clutches for locking the gears to the driven shaft, means for shifting the driven gears into and out of mesh with the driving-gears, the said gears being so located and arranged in connection with each other and with the clutches that the gears may be moved into and out of mesh without breaking the connection between the shafts and when the shifting is completed only one set of gears will be in connection, substantially as described.

4. In a variable gear, the combination of a driving-shaft, two or more gears of different diameters keyed thereon, a driven shaft, a corresponding set of gears sleeved thereon, clutches for locking said gears to the driven shaft, and means for shifting said driven gears into and out of mesh, successively while the load is on the driven gear of higher speed, substantially as described.

5. In a variable gear the combination of a driving-shaft, two or more gears of different diameters keyed thereon, a driven shaft, a corresponding set of gears sleeved thereon, clutches for locking said gears to the driven shaft, means for shifting said driven gears into and out of mesh and means whereby the clutch for one driven wheel will slip while the clutch of an adjacent driven wheel is locked during the shift from one speed to another, substantially as described.

6. In a variable gear the combination of a driving-shaft, two or more gears of different diameters keyed thereon, a driven shaft, a corresponding set of gears sleeved thereon, clutches for locking said gears to the driven shaft, means for shifting said driven gears into and out of mesh and means for directly coupling the driving-shaft to the load, substantially as described.

7. In a gearing for vehicles, the combination of a driving-shaft, two or more gears of different diameters keyed thereon, a driven shaft, a corresponding set of gears sleeved thereon, clutches for locking said gears to the driven shaft, means for shifting said driven gears into and out of mesh, a compensating gear driven through said variable-speed gear, a driving connection between both shafts of said variable gear and said compensating-gear, and means for controlling the connection of said shafts with said gear, substantially as described.

8. In a variable-speed gear, the combination of a driving-shaft, two or more gears of different diameters keyed thereon, a driven shaft, a corresponding set of gears sleeved thereon, clutch-jaws on said driven wheels, movable clutch-jaws carried by said driven shaft and adapted to be engaged by the jaws on said wheels and means for shifting said driven gears into and out of mesh, substantially as described.

9. In a variable-speed gear, the combination of a driving-shaft, two or more gears of different diameters keyed thereon, a driven shaft, a corresponding set of gears sleeved thereon, clutch-jaws on said driven wheels, spring-pressed sliding clutch-jaws carried by said driven shaft and adapted to be engaged by the jaws on said wheels and means for shifting said driven gears into and out of mesh, substantially as described.

10. In a variable-speed gear, the combination of a driving-shaft, two or more gears of different diameters keyed thereon, a driven shaft, a corresponding set of gears sleeved thereon, clutch-jaws on said driven wheels, longitudinally-movable clutch-jaws carried by said driven shaft and adapted to be engaged by the jaws on said wheels and means for shifting said driven gears into and out of mesh, substantially as described.

11. In a variable-speed gear, the combination of a driving-shaft, two or more gears of different diameters keyed thereon, a driven shaft, a corresponding set of gears sleeved thereon, clutch-jaws on said driven wheels, movable clutch-jaws dovetailed on said driven shaft and adapted to be engaged by the jaws on said wheels and means for shifting said driven gears into and out of mesh, substantially as described.

12. In a variable-speed gear, the combination of a driving-shaft, two or more gears of different diameters keyed thereon, a driven shaft, a corresponding set of gears sleeved thereon, clutch-jaws on said driven wheels spring-pressed sliding jaws dovetailed on said driven shaft and adapted to be engaged by the jaws on said wheels and means for shifting said driven gears into and out of mesh, substantially as described.

13. In a variable-speed gear, the combination of a driving-shaft, two or more gears of different diameters keyed thereon, a driven shaft, a corresponding set of gears sleeved thereon, clutch-jaws on said driven wheels, movable clutch-jaws carried by said driven shaft and adapted to be engaged by the jaws on said wheels, said clutch-jaws being beveled off in one direction to permit slippage of the jaws of one wheel while the jaws of a higher-speed wheel are locked, and means for shifting said driven gears into and out of mesh, substantially as described.

14. In a variable-speed gear, the combination of a driving-shaft, two or more gears of different diameters keyed thereon, a driven shaft, a corresponding set of gears sleeved thereon, clutch-jaws on said driven wheels, spring-pressed sliding clutch-jaws carried by said driven shaft and adapted to be engaged by the jaws on said wheels, said clutch-jaws being beveled off in one direction to permit slippage of the jaws of one wheel while the jaws of a higher-speed wheel are locked, and means for shifting said driven gears into and out of mesh, substantially as described.

15. In a variable-speed gear, the combination of a driving-shaft, two or more gears of different diameters keyed thereon, a driven shaft, a corresponding set of gears sleeved thereon, clutch-jaws on said driven wheels, clutch-jaws on said driven shaft adapted to be engaged by the jaws on said wheels, said clutch-jaws being beveled off in one direction to permit slippage of the jaws of one wheel while the jaws of a higher-speed wheel are locked, and means for shifting said driven gears into and out of mesh, substantially as described.

16. In a variable-speed gear, the combination of a driving-shaft, two or more gears of different diameters keyed thereon, a driven shaft, a corresponding set of gears sleeved thereon, clutch-jaws on said driven wheels, clutch-jaws on said driven shaft adapted to be engaged by the jaws on said wheels, said clutch-jaws being beveled off in one direction to permit slippage of the jaws of one wheel while the jaws of a higher-speed wheel are locked, means for shifting said driven gears into and out of mesh, and a yielding connection whereby said slippage is permitted against the pressure on said shifting means, substantially as described.

17. In a reversing-gear, the combination with a driving-shaft, a gear fixed thereon, a driven shaft, a gear movable thereon, and two reversing-pinions rotating together, one adapted to mesh with the gear on the driving-shaft and the other with the gear on the driven shaft, the said pinion adapted to be moved longitudinally along the shaft to be placed in or out of engagement with the said gear on the driving-shaft and on the driven shaft and means for producing a relative sliding movement of said gears to move them into and out of mesh, substantially as described.

18. In a reversing-gear, the combination with a driving-shaft, a gear fixed thereon, a driven shaft, a gear movable thereon, and two reversing-pinions rotating together, one adapted to mesh with the gear on the driving-shaft and the other with the gear on the driven shaft, means for moving said driven wheel into mesh with one reversing-pinion, and means operated through the movement of said driven wheel for moving the other reversing-pinion into mesh with the driving-wheel, substantially as described.

19. In a reversing-gear, the combination with a driving-shaft, a gear fixed thereon, a driven shaft, a gear movable thereon, and two reversing-pinions rotating together, one adapted to mesh with the gear on the driving-shaft and the other with the gear on the driven shaft, means for moving said driven wheel into mesh with one reversing-pinion and a pivoted lever operated through the movement of said driven wheel against spring tension for moving the other reversing-pinion into mesh with the driving-wheel, substantially as described.

20. In a reversing-gear, the combination with a driving-shaft, a gear fixed thereon, a driven shaft, a gear movable thereon, and two reversing-pinions rotating together, one adapted to mesh with the gear on the driving-shaft and the other with the gear on the driven shaft, means for moving said driven wheel into mesh with one reversing-pinion, a pivoted lever adapted through the movement of said driven wheel against spring tension for moving the other reversing-pinion into mesh with the driving-wheel, and a yielding operating-arm on said lever, substantially as described.

21. In a variable-speed gear, the combination with driving-gears and a series of driven wheels adapted to be moved into and out of mesh with said driving-gears, of a series of arms one and only one for moving each of said driven wheels, a single cam for moving each of said arms, and a controlling-lever for rotating said disk, substantially as described.

22. In a variable-speed gear, the combination with driving-gears and a series of driven wheels adapted to be moved into and out of mesh with said driving-gears, of a series of arms one and only one for moving each of said driven wheels, a single cam for moving each of said arms, a controlling-lever for rotating said disk, and a locking device for said lever, substantially as described.

23. In a variable-speed gear, the combination with the driving-gears and a series of driven gears adapted to be moved into and out of mesh with said driving-gears, the driving and driven gears being so located with relation to each other that all of the driving-gears will not be disconnected from the driven gears during the moving operation, of a series of arms for moving the driven gears, means for moving said arms, and a controlling-lever for controlling said means.

24. In a variable-speed gear, the combination with driving-gears and a series of driven wheels adapted to be moved into and out of mesh with said driving-gears, of a series of arms for moving said driven wheels, two cam-disks for moving said arms, said disks being geared together, and a controlling-lever for rotating said disks, substantially as described.

25. In a variable-speed gear, the combination with driving-gears and a series of driven wheels adapted to be moved into and out of mesh with said driving-gears, of a series of arms for moving said driven wheels, two cam-disks for moving said arms, said disks being geared together, and a controlling-lever for rotating said disks, a rack and pinion through which said disks are rotated, substantially as described.

26. In a variable-speed gear, the combination with driving-gears and a series of driven wheels adapted to be moved into and out of mesh with said driving-gears, of a series of arms for moving said driven wheels, two cam-disks for moving said arms, said disks being geared together, a controlling-lever for rotating said disks, and a locking device for said lever, substantially as described.

27. In a variable-speed gear, a driving-shaft, a plurality of gears of different diameters secured thereto, a driven shaft, a corresponding number of gears loosely sleeved thereon, means for locking said gears to the driven shaft, and a means for moving the gears carried by the driven shaft into and out of mesh with the gears carried by the driving-shaft, and means to provide a yielding connection between the driven shaft and the gears carried thereby.

28. In a variable-speed mechanism, a driving-shaft, gears of different diameters keyed to said shaft, a driven shaft, gears of different diameters sleeved on said shaft, clutch-jaws carried by the driven shaft, corresponding clutch-jaws on the gears carried by said shaft, and means adapted to yield when the clutch-jaws are brought in contact with each other.

29. In a gear mechanism, a driving-shaft, a series of gears of different diameters keyed thereto, a driven shaft, a series of driven gears loosely journaled thereon adapted to mesh with the first-mentioned gears, a compensating gear, connections between the compensating gear and the driving and driven gears, and means whereby the said connections can be moved so as to permit both the driving and driven gears to engage the compensating gear or either the one or the other to be disconnected therefrom.

30. In a gear mechanism, a driving-shaft, a series of gears of different diameters connected thereto, a driven shaft, a corresponding series of gears sleeved thereon and adapted to mesh with the first-mentioned gears, clutch-jaws whereby the driven gears can be fastened to the driven shaft, a bevel-gear connected to each of the driving and driven shafts, an intermediate bevel-gear meshing with the other bevel-gears, an arm carried by each of the driven gears, a disk having grooves therein adapted to move said arms, a lever operated to move said disk, means for moving the driven gears into or out of mesh with the driving-gears, and a connection between said arm and said means whereby the said means can be operated only when the said arm is in a given position.

31. In an apparatus of the class described, a driving-shaft, a series of wheels of different diameters keyed thereon, a driven shaft, a series of wheels of different diameters loosely sleeved thereon and adapted to mesh with the first-mentioned wheels, clutch mechanisms between the driven wheel and the gears carried thereby, a compensating gear, a beveled gear connected to said compensating gear, a beveled gear carried by each of the driving and driven shafts and adapted to mesh with the bevel-gear carried by the compensating gear, an arm carried by each of the driving and driven shafts, a disk having grooves therein, into which the arms move and adapted to move either one or the other of the beveled gears carried by the shafts out of mesh with the beveled gear carried by the compensating gear, a lever for operating said disk, an arm carried by said disk having a series of notches therein of different depth, a disk carrying a flange of different widths and adapted to move in said notches when said arm is placed in certain positions, said disk having a cam-groove, a lever operated by said cam-groove to move the driven wheels into and out of mesh with the driving-wheels and means for operating said disk.

32. In a device for shifting a gear, a plate having inturned flanges adapted to contact with the side of the gear, and means for moving said plate as and for the purposes set forth.

33. In a device for shifting a gear, a plate having each edge thereof inturned, the said inturned edges adapted to contact with both sides of the gear so that the gear may be moved in either direction on a shaft, a lever pivoted to said plate, said lever adapted to be operated to move the gear.

34. In an apparatus of the class described, a shaft having clutch-jaws secured thereto, a gear mounted on said shaft and adapted to slide longitudinally thereof, clutch-jaws carried by said gear and adapted to be moved into engagement with the clutch-jaws on the shaft, a shoe contacting with said gear and adapted to move it laterally, a lever pivoted to said shoe, and means for operating said lever.

35. In an apparatus of the class described, a rotating shaft, clutch-jaws secured thereto, a gear loosely sleeved on said shaft, clutch-jaws carried by the gear and adapted to engage the clutch-jaws on the shaft, a pair of shoes mounted at opposite edges of the said gear, each of said shoes having inturned edges adapted to contact with the side of the gear whereby upon the movement of the shoe the gear will be shifted laterally on the shaft to bring the clutch-jaws into and out of connection, a lever, and means for operating the said lever.

In testimony whereof I affix my signature in the presence of two witnesses.

FRANZ MARKGRAF.

Witnesses:
 H. M. SEAMANS,
 M. E. HALL.